US011192657B2

(12) United States Patent
Haynes et al.

(10) Patent No.: US 11,192,657 B2
(45) Date of Patent: Dec. 7, 2021

(54) EVACUATION SLIDE HAVING IMMEDIATELY EXTENDING BALLAST BAGS

(71) Applicant: GOODRICH CORPORATION, Charlotte, NC (US)

(72) Inventors: Timothy C. Haynes, Prescott Valley, AZ (US); Michael A. Luzader, Laveen, AZ (US)

(73) Assignee: Goodrich Corporation, Charlotte, NC (US)

( * ) Notice: Subject to any disclaimer, the term of this patent is extended or adjusted under 35 U.S.C. 154(b) by 263 days.

(21) Appl. No.: 16/443,260

(22) Filed: Jun. 17, 2019

(65) Prior Publication Data
US 2020/0391875 A1 Dec. 17, 2020

(51) Int. Cl.
*B64D 25/14* (2006.01)
(52) U.S. Cl.
CPC .................... *B64D 25/14* (2013.01)
(58) Field of Classification Search
CPC ........ B64D 25/14; B64D 25/16; B64D 25/18; A62B 1/20; B63B 7/08; B63C 9/04; B63C 2009/042
See application file for complete search history.

(56) References Cited

U.S. PATENT DOCUMENTS

| 4,434,870 | A | * | 3/1984 | Fisher | A62B 1/20 |
| | | | | | 182/48 |
| 4,460,062 | A | * | 7/1984 | Fisher | B64D 25/14 |
| | | | | | 182/48 |
| 5,975,467 | A | * | 11/1999 | O'Donnell | B64D 25/14 |
| | | | | | 182/48 |
| 6,375,529 | B1 | | 4/2002 | Infante | |
| 9,701,374 | B2 | | 7/2017 | Udupi et al. | |
| 2005/0115794 | A1 | * | 6/2005 | Zonneveld | A62B 3/00 |
| | | | | | 193/5 |
| 2018/0244358 | A1 | | 8/2018 | Terrell | |
| 2019/0061887 | A1 | | 2/2019 | Volny et al. | |

FOREIGN PATENT DOCUMENTS

GB          2171069        8/1986

* cited by examiner

*Primary Examiner* — Richard R. Green
*Assistant Examiner* — William L Gmoser
(74) *Attorney, Agent, or Firm* — Snell & Wilmer L.L.P.

(57) ABSTRACT

An evacuation slide may comprise a ballast bag attached to an underside of the evacuation slide. A first tension strap may be attached to the ballast bag. The tension strap may be configured to extend a bottom surface of the ballast bag away from the underside of the evacuation slide upon deployment of the evacuation slide.

17 Claims, 5 Drawing Sheets

EVACUATION SLIDE HAVING IMMEDIATELY EXTENDING BALLAST BAGS

FIELD

The present disclosure relates to aircraft evacuation systems and, in particular, to evacuation slides having ballast bags configured to extend upon inflation of the evacuation slide.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Conventional evacuation slides/life rafts typically include one or more ballast bags for stabilization. The ballast bags are configured to fill, at least partially, with water, thereby reducing a likelihood of the life raft capsizing. Existing ballast bags may not immediately take shape (e.g., extend), potentially reducing the likelihood that the ballast bags entrain water, which tends to leave the life raft susceptible to capsizing.

SUMMARY

An evacuation slide is disclosed herein. In accordance with various embodiments, the evacuation slide may comprise a first ballast bag attached to an underside of the evacuation slide and a first tension strap attached to the first ballast bag. The first tension strap may be configured to extend a bottom surface of the first ballast bag away from the underside of the evacuation slide upon deployment of the evacuation slide.

In various embodiments, the first ballast bag may comprise a sleeve coupled to the bottom surface of the first ballast bag. The first tension strap may be located between the sleeve and the bottom surface of the first ballast bag.

In various embodiments, evacuation slide may further comprise a sliding surface, a first side rail located at a first side of the sliding surface, and a second side rail located at a second side of the sliding surface opposite the first side of the sliding surface. In various embodiments, a second ballast bag may be coupled to the underside of the evacuation slide. A second tension strap may be attached to the second ballast bag and configured to extend a bottom surface of the second ballast bag away from the underside of the evacuation slide upon deployment of the evacuation slide.

In various embodiments, the first ballast bag may be coupled to the first side rail, and the second ballast bag may be coupled to the second side rail. In various embodiments, the first side rail may comprise a first upper tube and a first lower tube. The second side rail may comprise a second upper tube and a second lower tube. The first ballast bag may be coupled to the first lower tube. The second ballast bag may be coupled to the second lower tube.

In various embodiments, an inflatable pillow may be coupled to the underside of the evacuation slide. In various embodiments, the inflatable pillow may be located between the first tension strap and the first side rail.

An evacuation system is also disclosed herein. In accordance with various embodiments, the evacuation system may comprise a compressed fluid source and an evacuation slide fluidly coupled to the compressed fluid source. The evacuation slide may comprise a first ballast bag attached to an underside of the evacuation slide and a first tension strap attached to the first ballast bag. The first tension strap may be configured to extend a bottom surface of the first ballast bag away from the underside of the evacuation slide upon deployment of the evacuation slide.

In various embodiments, an inflatable pillow may be coupled to the underside of the evacuation slide. The inflatable pillow may be located between the first tension strap and the underside of the evacuation slide.

In various embodiments, the first ballast bag may comprise a sleeve coupled to the bottom surface of the first ballast bag. The first tension strap may be located between the sleeve and the bottom surface of the first ballast bag. In various embodiments, the first tension strap may be at least one of sewn or adhesively coupled to the first ballast bag.

In various embodiments, the evacuation slide may further comprise a sliding surface, a first side rail located at a first side of the sliding surface, and a second side rail located at a second side of the sliding surface opposite the first side of the sliding surface.

In various embodiments, the evacuation slide may further comprise a second ballast bag coupled to the underside of the evacuation slide. A second tension strap may be attached to the second ballast bag and configured to extend a bottom surface of the second ballast bag away from the underside of the evacuation slide upon deployment of the evacuation slide. In various embodiments, the first ballast bag may be coupled to the first side rail, and the second ballast bag may be coupled to the second side rail.

In various embodiments, the evacuation slide may further comprise a second ballast bag coupled the underside of the evacuation slide. In various embodiments, the first ballast bag may be located proximate a head end of the first side rail, the second ballast bag may be located proximate a toe end of the first side rail, and the first tension strap may be located between the second ballast bag and the underside of the evacuation slide.

A method of making an evacuation system is also disclosed herein. In accordance with various embodiments, the method may comprise attaching a ballast bag to an underside of an evacuation slide, coupling a tension strap to the ballast bag, and coupling the tension strap between a first attachment point on the evacuation slide and a second attachment point on the evacuation slide.

In various embodiments, the method may further comprise locating an inflatable pillow between the tension strap and the underside of the evacuation slide. In various embodiments, coupling the tension strap to the ballast bag may comprise locating the tension strap through a sleeve attached to a bottom surface of the ballast bag.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction inward, or generally, towards the reference component.

Evacuation systems of the present disclosure may include inflatable evacuation slides having a ballast bag coupled to a strap of the evacuation slide. In various embodiments, the strap may be coupled to a bottom surface of the ballast bag (i.e., a surface of the ballast bag that is oriented away from the underside of the slide). During inflation of the slide, the strap may translate away from the underside of the slide, thereby translating the bottom surface of the ballast bag away from the underside of the slide. In this regard, ballast bags of the present disclosure may be configured to translate to an extended position during inflation of the slide.

Figure 1:
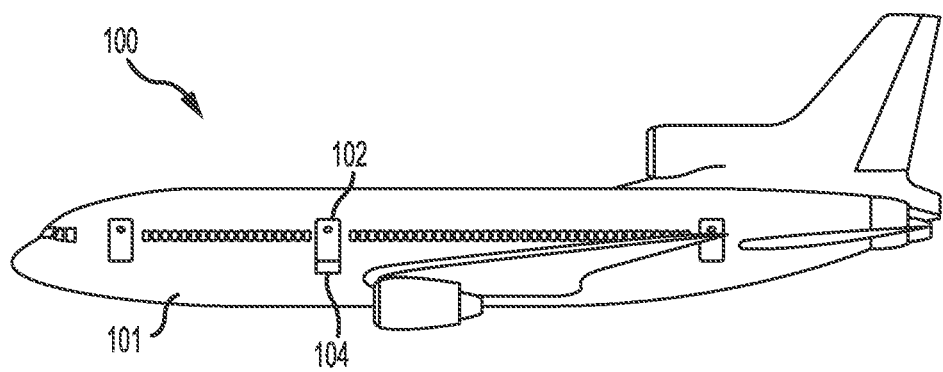
FIG. 1 illustrates an aircraft having an evacuation system, in accordance with various embodiments.

With reference to FIG. 1, an aircraft 100 is shown. Aircraft 100 may include a fuselage 101 having a plurality of exit doors, including an exit door 102. Aircraft 100 may include one or more evacuation systems positioned near a corresponding exit door. For example, aircraft 100 includes an evacuation system 104 positioned near exit door 102. In the event of an emergency, exit door 102 may be opened by a passenger or crew member of aircraft 100. In various embodiments, evacuation system 104 may deploy in response to exit door 102 being opened and/or in response to an action taken by a passenger or crew member such as depression of a button or actuation of a lever. While evacuation system 104 is disclosed as deploying from exit door 102, it is further contemplated and understood that evacuation system 104 may deploy from other locations. For example, evacuation system 104 may deploy from a wing of aircraft 100.

Figure 2A:
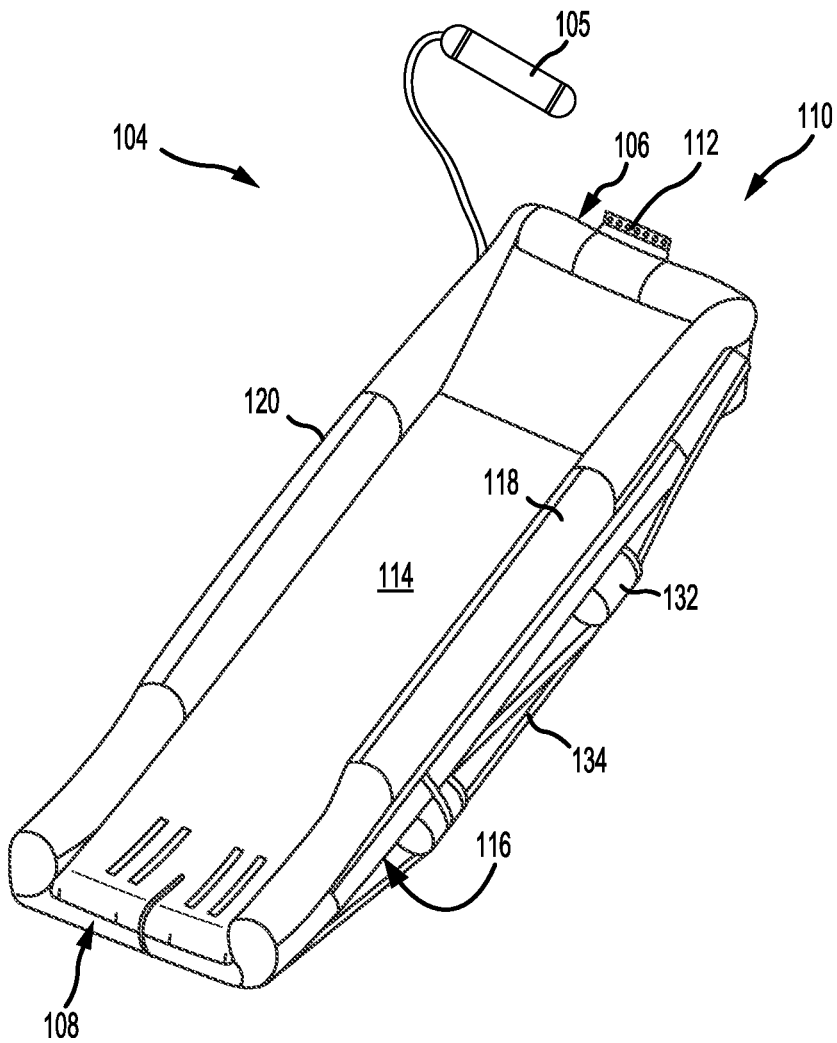
FIG. 2A illustrates a perspective view of the sliding surface of an evacuation slide in an inflated state, in accordance with various embodiments.

With reference to FIG. 2A, evacuation system 104 is illustrated in a deployed position. In accordance with various embodiments, evacuation system 104 may comprise an evacuation slide 110. In various embodiments, evacuation system 104 includes a compressed fluid source 105 fluidly coupled to evacuation slide 110. Compressed fluid source 105 may be configured to provide a pressurized gas to inflate evacuation slide 110.

FIG. 2A illustrates evacuation slide 110 in an inflated (or deployed) position. Evacuation slide 110 may be deployed from an aircraft. Evacuation slide 110 comprises an inflatable slide. Evacuation slide 110 includes a head end 106 and a toe end 108 opposite head end 106. Head end 106 may be coupled to an aircraft structure via a girt 112. Upon deployment, toe end 108 may contact an exit surface (e.g., the ground or the water). In the event of a water landing, evacuation slide 110 may be uncoupled from the aircraft structure and serve as a life raft.

Evacuation slide 110 includes a sliding surface 114 and an underside surface 116 opposite (e.g., oriented away from) sliding surface 114. Sliding surface 114 and underside surface 116 extend from head end 106 to toe end 108 of evacuation slide 110. Evacuation slide 110 further includes a first side rail 118 and a second side rail 120. First and second side rails 118, 120 are be disposed on opposing sides of sliding surface 114 and extend from head end 106 to toe end 108. Stated differently, first side rail 118 may located at a first side of sliding surface 114 and second side rail 120 may be located at a second side of sliding surface 114 opposite the first side. In various embodiments, first and second side rails 118, 120 may be in fluid communication. For example, in various embodiments, first side rail 118 and second side rail 120 may be part of one, interconnected chamber that fills with gas upon deployment of evacuation slide 110.

Figure 2B:
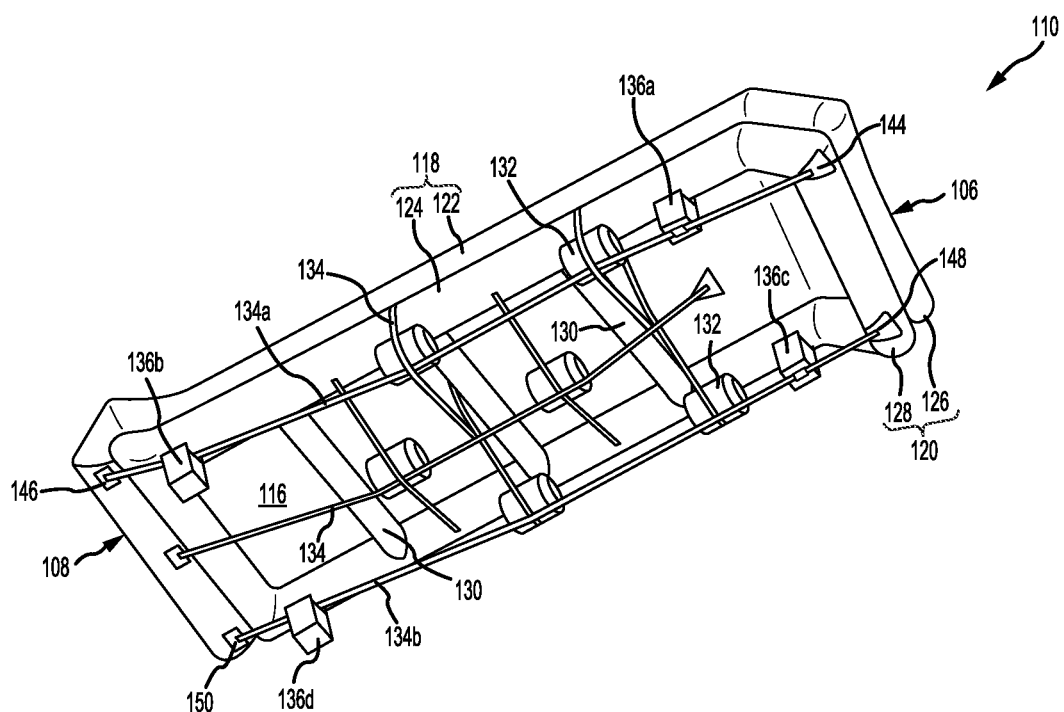
FIG. 2B illustrates a perspective view of an underside of an evacuation slide in an inflated state, in accordance with various embodiments.

With reference to FIG. 2B, an underside of evacuation slide 110 is illustrated. In various embodiments, first side rail 118 may include a first upper tube 122 and a first lower tube 124. Second side rail 120 may include a second upper tube 126 and a second lower tube 128. During deployment, first and second upper tubes 122, 126 are located distal to (i.e., farther away from) the exit surface as compared to first and second lower tubes 124, 128. In various embodiments, first lower tube 124 and second lower tube 128 may be part of an interconnected lower inflatable chamber that fills with gas upon deployment of evacuation slide 110, and first upper tube 122 and second upper tube 126 may be part of an interconnected upper inflatable chamber that fills with gas upon deployment of evacuation slide 110. In various embodiments, the upper inflatable chamber is in fluid communication with the lower inflatable chamber.

In various embodiments, evacuation slide 110 includes one or more transverse underside tube(s) 130. Underside tube(s) 130 may extend laterally between first side rail 118 and second side rail 120. Underside tubes 130 may inflate upon deployment of evacuation slide 110. In various embodiments, underside tubes 130 may be fluidly connected to first side rail 118 and second side rail 120. For example, underside tubes 130 may be fluidly coupled to first lower tube 124 and to second lower tube 128.

In various embodiments, evacuation slide 110 includes one or more inflatable pillow(s) 132. Pillows 132 may be coupled to first and second lower tubes 124, 128 and/or to underside surface 116 of evacuation slide 110. Pillows 132 may be configured to inflate upon deployment of evacuation slide 110. In various embodiments, pillows 132 may be fluidly coupled to first side rail 118 and second side rail 120. For example, pillows 132 may be fluidly coupled to first lower tube 124 and second lower tube 128.

In accordance with various embodiments, one or more tension straps 134 may be coupled to the underside of evacuation slide 110. Tension straps 134 may be coupled between head end 106 and toe end 108 of evacuation slide 110. Tension straps 134 may also be coupled to underside surface 116, to first side rail 118, and/or to second side rail 120. In various embodiments, tension straps 134 may extend in a transverse direction between first side rail 118 and second side rail 120 and in a longitudinal direction between head end 106 and toe end 108. Tension straps 134 may be coupled to the lower inflatable chamber and/or to the upper inflatable chamber of evacuation slide 110. Tension straps 134 may comprise rope, tape, ribbon, webbing, or any other suitable strap.

In accordance with various embodiments, tension straps 134 may be located over pillows 132. Stated differently, pillows 132 are located between tension straps 134 and underside surface 116. Pillows 132 may also be located between tension straps 134 and first side rail 118 and between tension straps 134 and second side rail 120. In various embodiments, pillows 132 are located between tension straps 134 and first lower tube 124 and between tension straps 134 and second lower tube 128. During deployment of evacuation slide 110, first and second side rails 118, 120 and pillows 132 inflate, thereby translating tension straps 134 away from first and second side rails 118, 120 and away from underside surface 116. Stated differently, the inflation of first and second side rails 118, 120 and of pillows 132 increases a distance between tension straps 134 and first and second side rails 118, 120 and/or between tension straps 134 and underside surface 116. In accordance with various embodiments, tension straps 134 come under tension as inflation of evacuation slide 110 occurs. In this regard, as pillows 132 and first and second side rails 118, 120 inflate, a tension in tension straps 134 increases. The increased tension in tension straps 134 tends to stabilize components (e.g., pillows 132, first and second side rails 118, 120, etc.) of evacuation slide 110.

In accordance with various embodiments, evacuation slide 110 includes one or more ballast bags, for example, ballast bag 136a, ballast bag 136b, ballast bag 136c, and ballast bag 136d (referred to herein collectively as ballast bags 136). Ballast bags 136 are coupled to an underside of evacuation slide 110. Ballast bags 136 may be coupled to evacuation slide 110 via stitching, adhesive, or any other desired attachment technique. Ballast bags 136 are configured to receive and retain water when evacuation slide 110 is employed as a life raft. When filled with water (e.g., when between 50-100% of a volume of ballast bag 136 is filled with water), ballast bags 136 tend to stabilize evacuation slide 110 and/or reduce a likelihood of evacuation slide 110 capsizing. Ballast bag 136 may be, for example, cylindrically shaped, square shaped, or various other shapes that allow ballast bags 136 to retain water. In various embodiments, ballast bags 136 may be made of, for example, nylon, ballistic nylon, polypropylene, polyester, cotton, or any other suitable material, whether coated or uncoated. In various embodiments, ballast bags 136 may be made of a nylon based textile having a coating comprising a polymeric material such as polyurethane, neoprene, or the like.

Figure 2C:
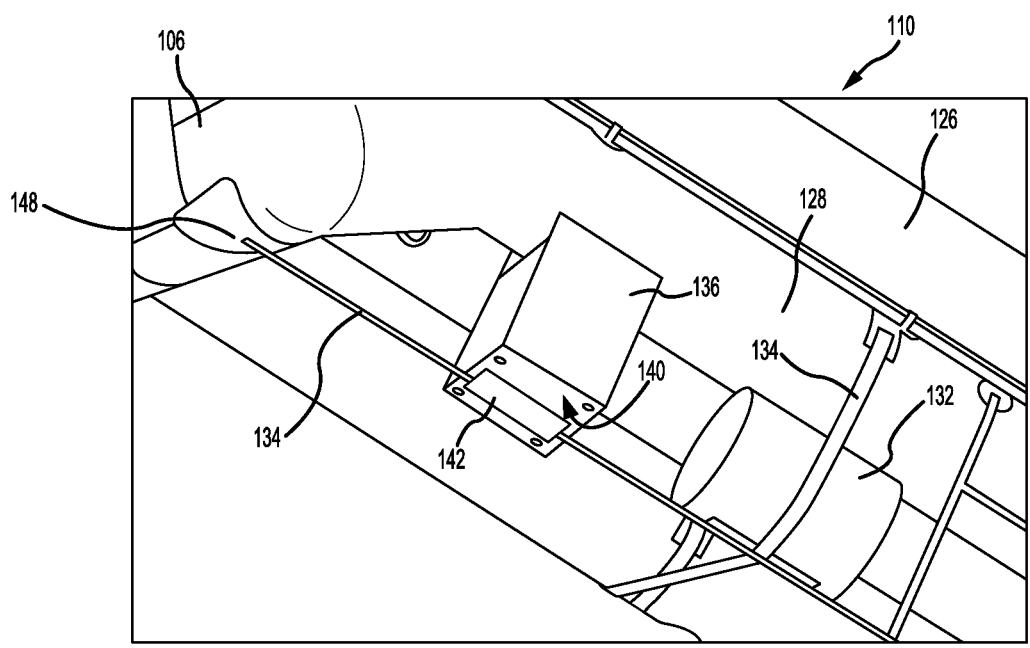
FIG. 2C illustrates a perspective view of an evacuation slide having a ballast bag coupled to a strap of the evacuation slide, in accordance with various embodiments.

Referring to FIG. 2C, in accordance with various embodiments, one or more of the ballast bags 136 is/are coupled to a tension strap 134. The tension strap 134 is configured to extend (i.e., translate) a bottom surface 140 of the ballast bag 136 away from the underside of evacuation slide 110 in response to deployment of evacuation slide 110. For example, inflation of pillow 132 may translate tension strap 134 away from second lower tube 128. As tension strap 134 translates away from second lower tube 128, ballast bag bottom surface 140, which is coupled to tension strap 134, also translates away from second lower tube 128, thereby extending the ballast bag 136. The bottom surface 140 of ballast bag 136 is oriented away from evacuation slide 110. Stated differently, bottom surface 140 is generally opposite the attachment interface between ballast bag 136 and evacuation slide 110.

In various embodiments, tension strap 134 may be coupled to bottom surface 140 of ballast bag 136. In various embodiments, a sleeve 142 is attached to bottom surface 140 of ballast bag 136. Sleeve 142 may be attached to bottom surface 140 via stitching, adhesive, or any other suitable attachment technique. Tension strap 134 may be coupled to ballast bag 136 by locating tension strap 134 between sleeve 142 and bottom surface 140. Tension strap 134 may also be attached to bottom surface 140 via stitching, adhesive coupling, or any other suitable attachment technique.

Returning to FIG. 2B, in various embodiments, ballast bags 136 may be coupled to first side rail 118 and second side rail 120. In various embodiments, evacuation slide 110 includes four (4) ballast bags 136, with one ballast bag 136 located proximate each of the four corners of evacuation slide 110. For example, ballast bag 136a and ballast bag 136b may be attached to first lower tube 124, and ballast bag 136c and ballast bag 136d may be attached to second lower tube 128. In various embodiments, ballast bag 136a may be coupled to first lower tube 124 proximate head end 106 and ballast bag 136b may be coupled to first lower tube 124 proximate toe end 108. In this regard, ballast bag 136a comprises a first-head (or left-head) ballast bag and ballast bag 136b comprises a first-toe (or left-toe) ballast bag. In various embodiments, ballast bag 136c may be coupled to second lower tube 128 proximate head end 106 and ballast bag 136d may be coupled to second lower tube 128 proximate toe end 108. In this regard, ballast bag 136c comprises a second-head (or right-head) ballast bag and ballast bag 136d comprises a second-toe (or right-toe) ballast bag.

In various embodiments, tension straps 134 may be coupled to the bottom surface of the ballasts bags located proximate head end 106 of evacuation slide 110, and located between the side rail and ballasts bags 136 located proximate toe end 108 of evacuation slide 110. For example, a first tension strap 134a may be coupled to a bottom surface 140 (with momentary reference to FIG. 2C) of ballast bag 136a and located between ballast bag 136b and first lower tube 124. In various embodiments, a second tension strap 134b may be coupled to a bottom surface 140 (with momentary reference to FIG. 2C) of ballast bag 136c and located between ballast bag 136d and second lower tube 128.

While evacuation slide 110 is illustrated as having four (4) ballast bags 136, with a ballast bag 136 located proximate each other the corners of evacuation slide 110, it is further contemplate and understood, that evacuation slide 110 may include any number of ballast bags 136 at any desired location. For example, in various embodiments, one or more ballast bags 136 may be coupled between underside surface 116 and a tension strap 134. Stated differently, one or more ballast bags 136 may be located laterally between first side rail 118 and second side rail 120. In various embodiments, tension straps 134 may be coupled to the bottom surface of the ballasts bags located proximate pillows 132, as the distance between tension straps 134 and evacuation slide 110 is increased at or near pillows 132.

In various embodiments, first tension strap 134a may be coupled to ballast bag 136a. First tension strap 134a may be attached to evacuation slide 110 at a first attachment point 144 and at a second attachment point 146. In accordance with various embodiments, at least one pillow 132 and at least one ballast bag 136 may be located along first tension strap 134a between first attachment point 144 and second attachment point 146. In various embodiments, second tension strap 134b may be coupled to ballast bag 136c. Second tension strap 134b may be attached to evacuation slide 110 at a first attachment point 148 and at a second attachment point 150. In accordance with various embodiments, at least one pillow 132 and at least one ballast bag 136 may be located along second tension strap 134b between first attachment point 148 and second attachment point 150.

First tension strap 134a is configured to extend ballast bag 136a upon deployment of evacuation slide 110. Second tension strap 134b is configured to extend ballast bag 136c upon deployment of evacuation slide 110. Translating ballast bags 136a and 136c to the extended position, tends to increase the internal volume of ballast bags 136a and 136c available for receiving and retaining water. In this regard, coupling tension straps 134 to ballast bags 136a and 136c tends to increase a likelihood that ballast bags 136a and 136c will extend and provide increased internal volume for water retention as compared to a folded, or non-extended ballast bag. Employing tension straps 134, as opposed to springs or bag weights, to extend ballast bags 136a and 136c tends to reduce an overall weight of evacuation slide 110.

Figure 3A:
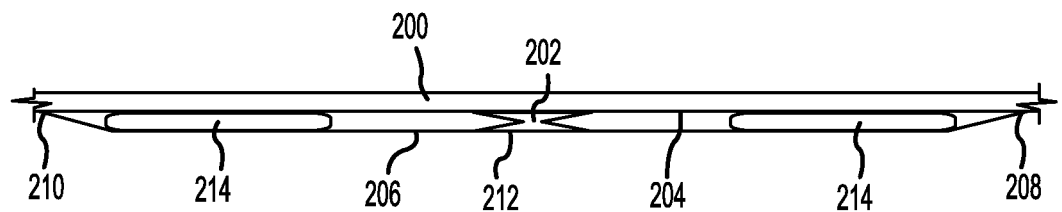
FIG. 3A illustrates a side view of an evacuation slide having a ballast bag coupled to a strap of the evacuation slide, with the evacuation slide in a deflated state, in accordance with various embodiments.
Figure 3B:
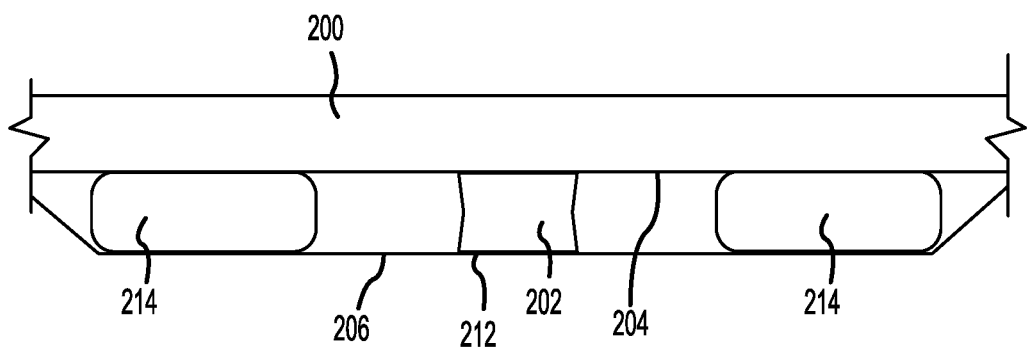
FIG. 3B illustrates a side view of an evacuation slide having a ballast bag coupled to a strap of the evacuation slide, with the evacuation slide in an inflated state, in accordance with various embodiments.

With reference to FIGS. 3A and 3B, a side view of an inflatable 200 in a deflated (or non-deployed) state and a side view of the inflatable 200 in an inflated (or deployed) are illustrated, respectively, in accordance with various embodiments. In various embodiments, inflatable 200 may comprise an evacuation slide, similar to evacuation slide 110 in FIG. 2A. In accordance with various embodiments, a ballast bag 202 is coupled to an underside 204 of inflatable 200. When inflatable 200 is in the non-deployed state, ballast bag 202 may be configured in a folded, or non-extended, position.

Inflatable 200 includes a tension strap 206. Tension strap 206 is coupled between first attachment point 208 and a second attachment point 210 on inflatable 200. Tension strap 206 is configured to translate ballast bag 202 to an extended position, upon deployment (i.e., inflation) of inflatable 200. In various embodiments, tension strap 206 may be coupled to a bottom surface 212 of ballast bag 202. Bottom surface 212 of ballast bag 202 is oriented away from underside 204 of inflatable 200. Upon inflation of inflatable 200, tension strap 206 may translate bottom surface 212 away from underside 204 of inflatable 200.

In various embodiments, inflatable 200 includes one or more pillows 214. Pillows 214 may be configured to inflate upon deployment of inflatable 200. In various embodiments, pillows 214 are fluidly coupled to inflatable 200. In accordance with various embodiments, pillows 214 may be located between underside 204 of inflatable 200 and tension strap 206. In various embodiments, inflation of pillows 214 is configured to translate tension strap 206, and thus bottom surface 212 of ballast bag 202, away from underside 204 of inflatable 200.

Translating ballast bag 202 to the extended position, tends to increase the internal volume of ballast bag 202 for receiving and retaining water. In this regard, coupling tension strap 206 to ballast bag 202 tends to increase a likelihood that ballast bag 202 will extend and provide a greater available volume for water retention. Employing tension strap 206, as opposed to springs or bag weights, to extend ballast bag 202 tends to reduce an overall weight of inflatable 200.

Figure 4:
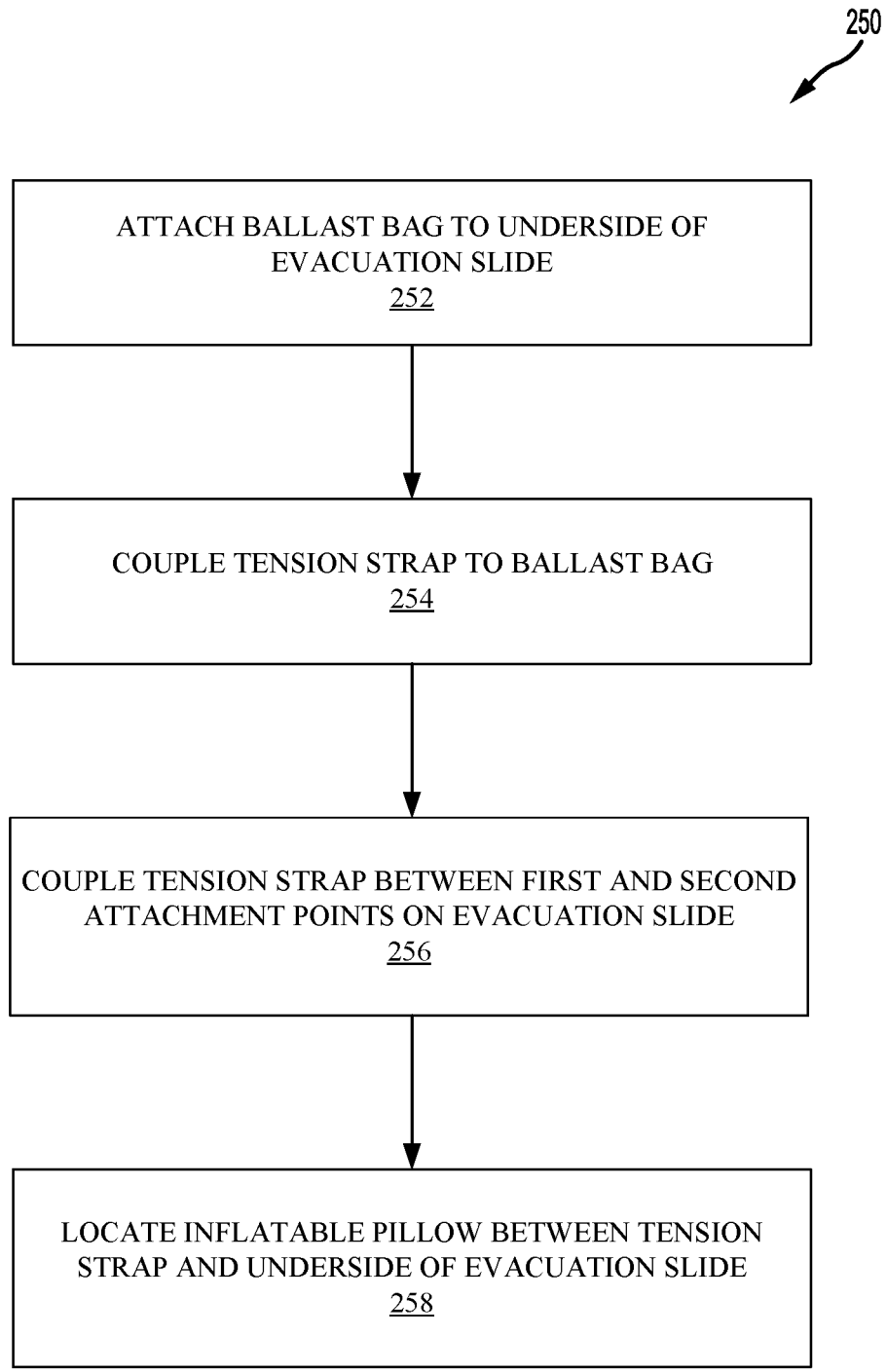
FIG. 4 illustrates a method of making an evacuation system, in accordance with various embodiments.

Referring to FIG. 4, a method 250 of making an evacuation system is illustrated. In accordance with various embodiments, method 250 may comprise attaching a ballast bag to an underside of an evacuation slide (step 252), coupling a tension strap to the ballast bag, (step 254), and coupling the tension strap between a first attachment point on the evacuation slide and a second attachment point on the evacuation slide (step 256).

In various embodiments, method 250 may further comprise locating an inflatable pillow between the tension strap and the underside of the evacuation slide (step 258). In various embodiments, step 254 may comprise locating the tension strap through a sleeve attached to a bottom surface of the ballast bag.

With combined reference to FIG. 4 and FIG. 3A, in various embodiments, step 252 may include attaching ballast bag 202 to underside 204 of inflatable 200. Step 254 may include coupling tension strap 206 to ballast bag 202. Step 256 may include coupling tension strap 206 between first attachment point 208 and second attachment point 210 on inflatable 200.

In various embodiment, step 258 may include locating inflatable pillow 214 between tension strap 206 and underside 204 of inflatable 200. In various embodiments, step 254 may comprise locating tension strap 206 through a sleeve (similar to sleeve 142 in FIG. 2C) attached to bottom surface 212 of ballast bag 202.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
   a first ballast bag attached to an underside of the evacuation slide, the first ballast bag comprising a sleeve coupled to a bottom surface of the first ballast bag; and
   a first tension strap attached to the first ballast bag, the first tension strap being located between the sleeve and the bottom surface of the first ballast bag, wherein the first tension strap is configured to extend the bottom surface of the first ballast bag away from the underside of the evacuation slide upon deployment of the evacuation slide.

2. The evacuation slide of claim 1, further comprising:
   a sliding surface;
   a first side rail located at a first side of the sliding surface; and
   a second side rail located at a second side of the sliding surface opposite the first side of the sliding surface.

3. The evacuation slide of claim 2, further comprising:
   a second ballast bag coupled to the underside of the evacuation slide; and
   a second tension strap attached to the second ballast bag and configured to extend a bottom surface of the second ballast bag away from the underside of the evacuation slide upon deployment of the evacuation slide.

4. The evacuation slide of claim 3, wherein the first ballast bag is coupled to the first side rail, and wherein the second ballast bag is coupled to the second side rail.

5. The evacuation slide of claim 4, wherein the first side rail comprises a first upper tube and a first lower tube, the first ballast bag being coupled to the first lower tube, and wherein the second side rail comprises a second upper tube and a second lower tube, the second ballast bag being coupled to the second lower tube.

6. The evacuation slide of claim 2, further comprising an inflatable pillow coupled to the underside of the evacuation slide.

7. The evacuation slide of claim 6, wherein the inflatable pillow is located between the first tension strap and the first side rail.

8. An evacuation system comprising:
   a compressed fluid source; and
   an evacuation slide fluidly coupled to the compressed fluid source, the evacuation slide comprising:
      a first ballast bag attached to an underside of the evacuation slide;
      a first tension strap attached to a first bottom surface of the first ballast bag, wherein the first tension strap is configured to extend the first bottom surface of the first ballast bag away from the underside of the evacuation slide upon deployment of the evacuation slide; and
      a second ballast bag coupled to the underside of the evacuation slide, wherein the first tension strap is located between an upper end of the second ballast bag and the underside of the evacuation slide, and wherein a second bottom surface of the second ballast bag is configured to extend away from the upper end of the second ballast bag and from the underside of the evacuation slide.

9. The evacuation system of claim 8, further comprising an inflatable pillow coupled to the underside of the evacuation slide, wherein the inflatable pillow is located between the first tension strap and the underside of the evacuation slide.

10. The evacuation system of claim 9, wherein the first ballast bag comprises a sleeve coupled to the first bottom surface of the first ballast bag, and wherein the first tension strap is located between the sleeve and the first bottom surface of the first ballast bag.

11. The evacuation system of claim 9, wherein the first tension strap is at least one of sewn or adhesively coupled to the first ballast bag.

12. The evacuation system of claim 8, wherein the evacuation slide further comprises:
    a sliding surface;
    a first side rail located at a first side of the sliding surface; and
    a second side rail located at a second side of the sliding surface opposite the first side of the sliding surface.

13. The evacuation system of claim 12, wherein the evacuation slide further comprises:
    a third ballast bag coupled to the underside of the evacuation slide; and
    a second tension strap attached to the third ballast bag and configured to extend a third bottom surface of the third ballast bag away from the underside of the evacuation slide upon deployment of the evacuation slide.

14. The evacuation system of claim 13, wherein the first ballast bag is coupled to the first side rail, and wherein the third ballast bag is coupled to the second side rail.

15. The evacuation system of claim 12, wherein the first ballast bag is located proximate a head end of the first side rail and the second ballast bag is located proximate a toe end of the first side rail.

16. A method of making an evacuation system, comprising:
    attaching a ballast bag to an underside of an evacuation slide;
    coupling a tension strap to a bottom surface of the ballast bag, the bottom surface being oriented away from the underside of the evacuation slide;

coupling the tension strap between a first attachment point on the evacuation slide and a second attachment point on the evacuation slide; and locating an inflatable pillow between the tension strap and the underside of the evacuation slide, wherein the inflatable pillow is configured to translate the tension strap and the bottom surface of the ballast bag away from the underside of the evacuation slide upon deployment of the evacuation slide.

17. The method of claim 16, wherein coupling the tension strap to the ballast bag comprises locating the tension strap through a sleeve attached to the bottom surface of the ballast bag.

* * * * *